United States Patent

Krishna

[11] Patent Number: 5,821,526
[45] Date of Patent: Oct. 13, 1998

[54] STAR SCANNING METHOD FOR DETERMINING THE LINE OF SIGHT OF AN ELECTRO-OPTICAL INSTRUMENT

[75] Inventor: Ramuhalli Krishna, Fort Wayne, Ind.

[73] Assignee: ITT Defense, Inc., McLean, Va.

[21] Appl. No.: 591,708

[22] Filed: Jan. 25, 1996

[51] Int. Cl.⁶ ................................................ G01C 21/02
[52] U.S. Cl. .................................. 250/203.6; 250/203.3; 250/234; 356/139.01
[58] Field of Search ............................. 250/203.6, 203.1, 250/206.2, 206.1, 234, 235, 203.3, 203.4; 356/139.01

[56] References Cited

U.S. PATENT DOCUMENTS

| | | | |
|---|---|---|---|
| 4,801,202 | 1/1989 | Wilcox | 356/152 |
| 4,944,587 | 7/1990 | Harigae | 356/152 |
| 5,302,823 | 4/1994 | Franklin et al. | 250/252.1 |
| 5,319,969 | 6/1994 | Billing-Ross et al. | 73/178 R |
| 5,600,123 | 2/1997 | Purrazzella | 250/203.3 |

*Primary Examiner*—Edward P. Westin
*Assistant Examiner*—Kevin Pyo
*Attorney, Agent, or Firm*—Plevy & Associates

[57] ABSTRACT

A method for determining the line of sight of an electro-optical device mounted in a spacecraft such as a satellite. The electro-optical device includes an electo-optical element that detects impinging light energy and produces electrical pulses corresponding to the light energy detected. The method involves providing the electro-optical device with a scan mirror which is rotated to scan space to detect the light produced by a suitably bright star. Once detected, the scan mirror selectively directs the light produced by the detected star toward the electro-optical element which produces electrical pulses in response to the light. A computer on-board the spacecraft then compares the electrical pulses outppputed by the electro-optical device to a predetermined output expected for the star, to determine the line of sight of the electro-optical device.

25 Claims, 1 Drawing Sheet

STAR SCANNING METHOD FOR DETERMINING THE LINE OF SIGHT OF AN ELECTRO-OPTICAL INSTRUMENT

FIELD OF INVENTION

The present invention generally relates to earth scanning electro-optical instruments used in spacecraft and more particularly to a method for determining the line of sight of an electro-optical instrument.

BACKGROUND OF THE INVENTION

Spacecraft such as satellites, which employ onboard electro-optical instruments for earth scanning are well known in the art. For example, such optical instruments include GOES Imager/Sounder radiometer instruments which are used on 3-axis stabilized geo-synchronous satellites which are satellites that remain in a substantially stationary position over a particular earth location. The GOES Imager/Sounder instruments scan the earth and provide pictures for weather forecasting.

Conventional radiometers generally consist of an objective lens or mirror which collects radiation from a radiant source and images the radiation directly onto the surface of a detector capable of converting the radiation into an electrical signal. The mirror on radiometers used on satellites is positioned to look out into space. The mirror can be rotated to scan the earth to attain an image of the radiant energy source of interest, which is reflected onto telescopic mirrors included in the radiometer. The telescopic mirrors focus the radiant energy onto the detector of the radiometer which converts the radiant energy into electrical signals which are relayed to controllers at ground stations on the earth.

The attitude of the satellite can be determined by the use of a separate optical radiometer instrument or by using the Imager/Sounder instruments themselves in a star scanning mode. In any case, the exact line of sight (LOS) of the separate radiometer instrument or Image/Sounder radiometer instruments must be ascertained and several calibration factors updated.

This is presently accomplished using a static star staring method whereby the instrument is locked into a star staring mode and waits for a star which is chosen for its suitability with respect to brightness and location to pass through the field of view of the instrument. More specifically, the LOS of the instrument is positioned such that the LOS is slightly ahead of the expected position of the selected star to be sensed. The motion of the spacecraft causes the star image to drift through the field of view of the instrument. Then, knowing the position of the star relative to the appropriate earth coordinates and the time of transition of the star image through field of view of the instrument, the LOS of the instrument relative to the earth coordinates can be accurately determined. This is performed by transmitting the data generated by the instrument to a ground station where it is processed to determine the LOS of the instrument. Once the LOS of the instrument is determined, the ground station transmits several updated calibration factors to the satellite. Such a method is described in U.S. Pat. No. 4,801,202 entitled METHOD AND APPARATUS FOR RADIOMETER STAR SENSING issued on Jan. 31, 1989 to J. E. Wilcox and assigned to ITT Aerospace Optical.

The static star staring method described above, however, have several drawbacks. First, star staring is extremely time consuming and typically takes between 15 and 30 minutes. Thus, the best duty cycle possible with this method is approximately 67% or about 15 minutes star sensing and about 30 minutes imaging. Second, the star staring method requires thermal calibration to compensate for low frequency error build up in order to minimize pointing errors caused by thermal effects. If no thermal calibrations were made, pointing errors on the order of greater than 400 microradians would be observed. Moreover, even with thermal calibration, the star staring method is still characterized by pointing errors of greater than 30 microradians. Third, the calibration coefficients generated during thermal calibration and the like must be uploaded every day of the year which requires round the clock manual ground processing, 365 days of the year which is very costly.

It is, therefore, a primary object of the present invention, to provide an improved method for determining the LOS of an optical radiometer instrument used on a spacecraft such as a satellite, which substantially eliminates the elaborate and expensive calibration procedures of prior art methods and improves the pointing accuracies of the instrument.

SUMMARY OF THE INVENTION

A method for determining the line of sight of an electro-optical device. The electro-optical device includes an electo-optical element that detects impinging radiant energy and produces electrical signals corresponding to the radiant energy detected. The method involves providing the electro-optical device with reflecting means which scans space to detect the radiant energy produced by a radiant energy source. Once detected, the reflecting means selectively directs the radiant energy produced by the radiant energy source toward the electro-optical element which produces electrical signals in response to the radiant energy. The electrical signals outputted by the electro-optical device are compared to a predetermined output expected for the radiant energy source, to determine the line of sight of the electro-optical device.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Figure 1:
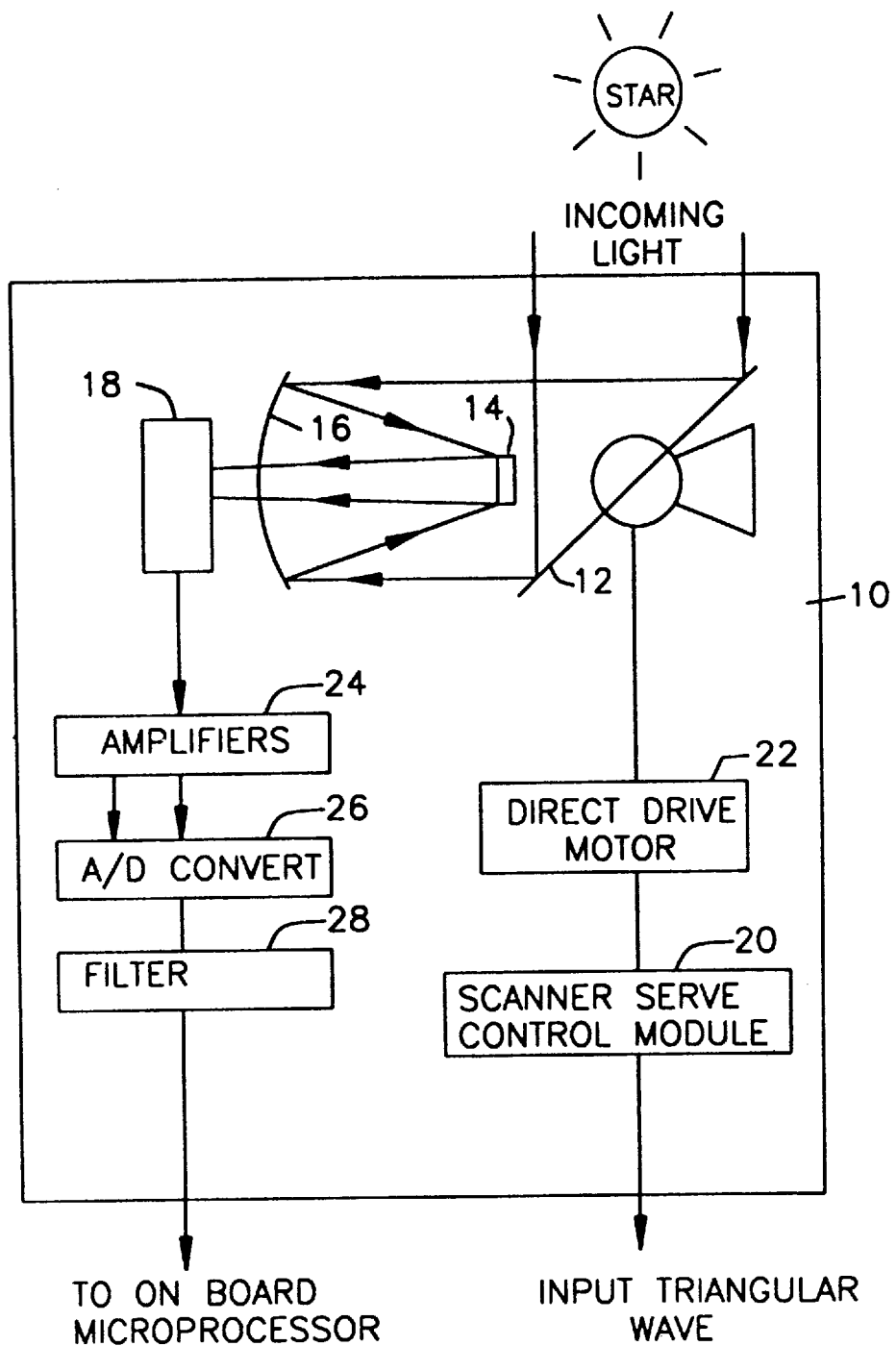
FIG. 1 is a schematic diagram of a exemplary radiometer which can be used to implement the method of the present invention.

The method of the present invention generally involves operating an electro-optical instrument mounted on a spacecraft in a scanning mode to scan a suitable star in order to identify the LOS of the instrument within 2 to 8 seconds. Star scanning allows the optical instrument of the spacecraft to be simultaneously operated in another mode referred to in the art as space look, thus, the duty cycle of the method of the present invention is approximately 95% to 100%.

Since the star scanning method of the present invention can be performed in 2 to 8 seconds, star scanning can be performed at least every 2 minutes and preferably every minute, instead of every 30 minutes as in prior art star staring methods. This provides many distinct advantages. One advantage is that the LOS of the optical instrument is determined with greater certainty when compared to prior art methods. More specifically, the LOS of the optical instrument is approximately 30 microrads (1073 meters at geosynchronous altitude) when determined according to the present invention versus approximately 1200 microrads with the current method. This enables the star scan to be made even faster. A second advantage of the method of the present invention is that the LOS drift due to thermal effects and other slowly varying disturbances remain small since two star scans can be performed in 2 or less minutes. In particular, pointing errors reach only about 13 microradians as a result of the present invention and thus, the need for the expensive thermal calibration techniques required in the prior art methods is substantially eliminated by the method of the present invention. Another advantage concerns the quantity of data generated by the method of the present invention. Since the method of the present invention does not require continuous calibration to correct for thermal effects and the like, data processing requirements are reduced such that most or all of the remaining data processing can be done onboard the spacecraft. This in turn completely eliminates the determination and the uploading of calibration coefficients which substantially reduces or eliminates the expensive round the clock manual ground processing. Accordingly, the method of the present invention allows the spacecraft's electro-optical instrument to operate as an autonomous inertial reference system. Further, the method of the present invention provides substantial improvements in location accuracies. More specifically, the method of the present invention minimizes pointing errors to less than 5 microrads (180 meters at geosynchronous altitude) without calibration. This is a substantial improvement over the prior art method described earlier which provides pointing errors of greater than 30 microrads even after calibration.

The method of the present invention can be implemented with the radiometer 10 shown in FIG. 1. It should be understood, however, that the method of the present invention can also be implemented with other well known radiometer designs. One example of such a design is described in the earlier mentioned U.S. Pat. No. 4,801,202 entitled METHOD AND APPARATUS FOR RADIOMETER STAR SENSING issued on Jan. 31, 1989 to J. E. Wilcox and assigned to ITT Aerospace Optical. The entire disclosure of U.S. Pat. No. 4,801,202 is incorporated herein by reference.

As shown in FIG. 1, the radiometer 10 comprises a two axis scan mirror 12 and a detector array 18 of high resolution detectors. The scan mirror 12 has a field of view that extends beyond the limb of the earth by at least one or two degrees. The scan mirror 12 is connected to a telescope assembly which includes a primary mirror 14 connected to a secondary mirror 16. The secondary mirror 16 focuses or collimates light obtained from the scan mirror 12 onto the primary mirror 14 which in turn focuses or collimates that light onto the detector array 18 which serves to convert the light energy into analog electrical signals. The analog electrical signals are conveyed to amplifiers 24 which amplify the signals and send them to an analog to digital converter 26. The analog to digital converter 26 takes each of the amplified analog voltage signals and converts the signals into a digital signals which are processed by a microprocessor which determines a spike or a pulse that occurs when a star is sensed during scanning. A set of electronic filters 28 may be optionally provided to minimize noise in the detector data. One of ordinary skill in the art will understand that the amplified analog signals needn't be converted to digital signals if well known analog circuits are provided to process the analog signals to analyze the spike or pulse that occurs when a star is scanned.

Scan control is generated by establishing a desired angular location for the scan mirror 12. The desired angle is transmitted from a scanner servo control module 20 to a direct drive motor 22 which rotates the scan mirror 12 along its 2 axis. In the present invention, a triangular wave is inputed into the scanner servo control module 20 to generate a slow scan speed of lower than 5 degrees/second. This is necessary in order to achieve a good signal to noise ratio.

The movement of the scan mirror 12 of the radiometer 10 affects the attitude of the spacecraft and thus, the accuracy of pointing. The radiometer 10 generates output signals which inform the spacecraft's computer when the scan mirror 12 is moving and in what direction. The spacecraft's computer determines the change in the spacecraft's attitude and generates analog signals proportional to the change in direction. These signals are used to offset the scan mirror 12 to cancel the change in attitude.

The star scanning method of the present invention will now be described. Star scanning commences at least every 2 minutes and preferably every minute. Upon commencement the scanner servo control module 20 energizes the direct drive motor 20 which moves the scan mirror 12 along its two axis at a rate lower than 5 degrees/second for approximately 2–8 seconds until the light of a star is sensed by the detector array 18. Then, knowing the position of the star relative to the appropriate earth coordinates and the time of transition of the star image through the detector array 18, the attitude of the LOS of the radiometer 10 can be accurately determined on board by the spacecraft's computer. The computer accomplishes this by comparing the electrical output signals produced by the instrument to a predetermined output expected for the radiant energy measured from the detected star. The method is then repeated every 1 to 2 minutes.

The star scanning method of the present invention substantially improves the location accuracy of the pixels in the image generated by the optical instrument. By using an inertial reference system, such as a gyro or a star tracker, to measure the attitude changes of the spacecraft, overall pointing accuracies of the optical instrument can be improved to better than 5 microradians even in the presence of other activities onboard the spacecraft. Thus, the spacecraft need not be dedicated to one particular function. For example, GOES Imager/Sounder instruments can be placed and operated on a communication satellite since the instrument can operate as an autonomous system. Thus, the method of the present invention allows the instrument to be placed on any other application satellite. Further, the higher pointing accuracies afforded by the method of the present invention make it possible to use a radiometer for new applications such as missile tracking. Moreover, all earth observation satellites that require optical scanning such as meteorological, weather, oceanography, mineral resources agriculture and forest fire detecting satellites can benefit from the method of the present invention.

The method of the present invention is also useful in imaging the earth or other planets for topographical data, missile warning and satellite tracking systems, and scientific satellites that require optical scanning.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

What is claimed is:

1. A method for determining the line of sight of an electro-optical device having an electro-optical element that detects impinging radiant energy and produces electrical output signals corresponding to the radiant energy detected, said method comprising the steps of:
   a) providing said electro-optical device with reflecting means for selectively directing radiant energy, produced by a radiant energy source located in space, toward said electro-optical element;
   b) rotating said reflecting means relative to said electro-optical element to scan space for a radiant energy source;
   c) selectively directing said radiant energy produced by said radiant energy source toward said electro-optical element with said reflecting means;
   d) producing electrical output signals with said optical element in response to said radiant energy which correspond to said radiant energy; and
   e) comparing said electrical output signals produced by said electro-optical device to a predetermined output expected for said radiant energy source, to determine said line of sight of said electro-optical device.

2. The method according to claim 1, wherein said electrical output signals comprise electrical pulses.

3. The method according to claim 1, wherein said steps a–e are repeated approximately every two minutes.

4. The method according to claim 1, wherein said steps a–e are repeated approximately every minute.

5. The method according to claim 1, wherein said step of selectively directing said radiant energy includes collimating said radiant energy produced by said radiant energy source toward said electro-optical element.

6. The method according to claim 1, wherein said electro-optical device is disposed in a spacecraft including at least a second electro-optical device, said at least second electro-optical device simultaneously performing another activity which is separate from said method performed by said electro-optical device.

7. The method according to claim 1, wherein said step of rotating includes rotating said reflecting means along at least one axis.

8. The method according to claim 7, wherein said step of rotating is performed at a rate of less than 5 degrees per second.

9. The method according to claim 1, wherein said step of rotating is performed for between 2 and 8 seconds which enables said radiant energy source to be detected.

10. The method according to claim 1, wherein the accuracy of said line of sight is approximately 30 microradians.

11. The method according to claim 1, wherein the error in said line of sight measured between any two repetitions of said steps a–e is approximately 13 microradians.

12. The method according to claim 1, wherein said electro-optical device is mounted in a spacecraft and said step of comparing is performed on-board said spacecraft.

13. The method according to claim 1, wherein the pointing error of said electro-optical device is less than 5 microradians.

14. The method according to claim 1, wherein said electro-optical device comprises a radiometer.

15. The method according to claim 14, wherein said radiometer device includes an imager/sounder.

16. A method for determining the line of sight of an electro-optical device having an electro-optical element that detects impinging radiant energy and produces electrical pulses corresponding to the radiant energy detected, said electro-optical device mounted in a spacecraft, said method comprising the steps of:
   a) providing said electro-optical device with reflecting means for selectively directing radiant energy, produced by a radiant energy source located in space, toward said electro-optical element;
   b) rotating said reflecting means relative to said electro-optical element approximately every two minutes to scan said space for said radiant energy source;
   c) collimating said radiant energy produced by said radiant energy source toward said electro-optical element;
   d) producing electrical pulses with said optical element in response to said radiant energy which correspond to said radiant energy; and
   e) comparing said electrical pulses produced by said electro-optical device to a predetermined output expected for said radiant energy source, to determine said line of sight of said electro-optical device.

17. The method according to claim 16, wherein said electro-optical device is disposed in a spacecraft including at least a second electro-optical device, said at least second electro-optical device simultaneously performing another activity which is separate from said method performed by said electro-optical device.

18. The method according to claim 16, wherein said step of rotating includes rotating said reflecting means along at least one axis at a rate of less than 5 degrees per second.

19. The method according to claim 16, wherein said step of rotating is performed for between 2 and 8 seconds which enables said radiant energy source to be detected.

20. The method according to claim 16, wherein the accuracy of said line of sight is approximately 30 microradians.

21. The method according to claim 16, wherein the error in said line of sight measured between any two repetitions of said steps a–e is approximately 13 microradians.

22. The method according to claim 16, wherein said step of comparing is performed on-board said spacecraft.

23. The method according to claim 16, wherein the pointing error of said electro-optical device is less than 5 microradians.

24. The method according to claim 16, wherein said electro-optical device comprises a radiometer.

25. The method according to claim 24, wherein said radiometer device includes an imager/sounder.

* * * * *